United States Patent [19]

Takahashi

[11] Patent Number: 4,819,690

[45] Date of Patent: Apr. 11, 1989

[54] PRESSURE CONTROL VALVE

[75] Inventor: Masahiko Takahashi, Kodaira, Japan

[73] Assignee: Fuji Jukogyo Kabushiki Kaisha, Tokyo, Japan

[21] Appl. No.: 130,881

[22] Filed: Dec. 10, 1987

[30] Foreign Application Priority Data

Dec. 17, 1986 [JP] Japan ................................. 61-300632

[51] Int. Cl.$^4$ ............................................. F16K 47/02
[52] U.S. Cl. ................................. 137/514; 137/625.34
[58] Field of Search ............................. 137/514, 625.34

[56] References Cited

U.S. PATENT DOCUMENTS

| 3,053,116 | 9/1962 | Christenson et al. | 137/514 X |
| 3,721,266 | 3/1973 | Ikebe et al. | 137/625.34 X |
| 4,087,967 | 5/1978 | Knapp | 137/662.34 X |
| 4,467,674 | 8/1984 | van Deursen et al. | 74/867 |

Primary Examiner—John Rivell
Attorney, Agent, or Firm—Martin A. Farber

[57] ABSTRACT

A pressure control valve has a spool slidably mounted in a valve body. The valve body has a chamber between opposed lands of the spool. An oil guide is provided in the chamber. The oil guide has a passage arranged to apply oil pressure to the lands. The passage has a small cross-sectional area so as to reduce pulsation of oil pressure.

13 Claims, 2 Drawing Sheets

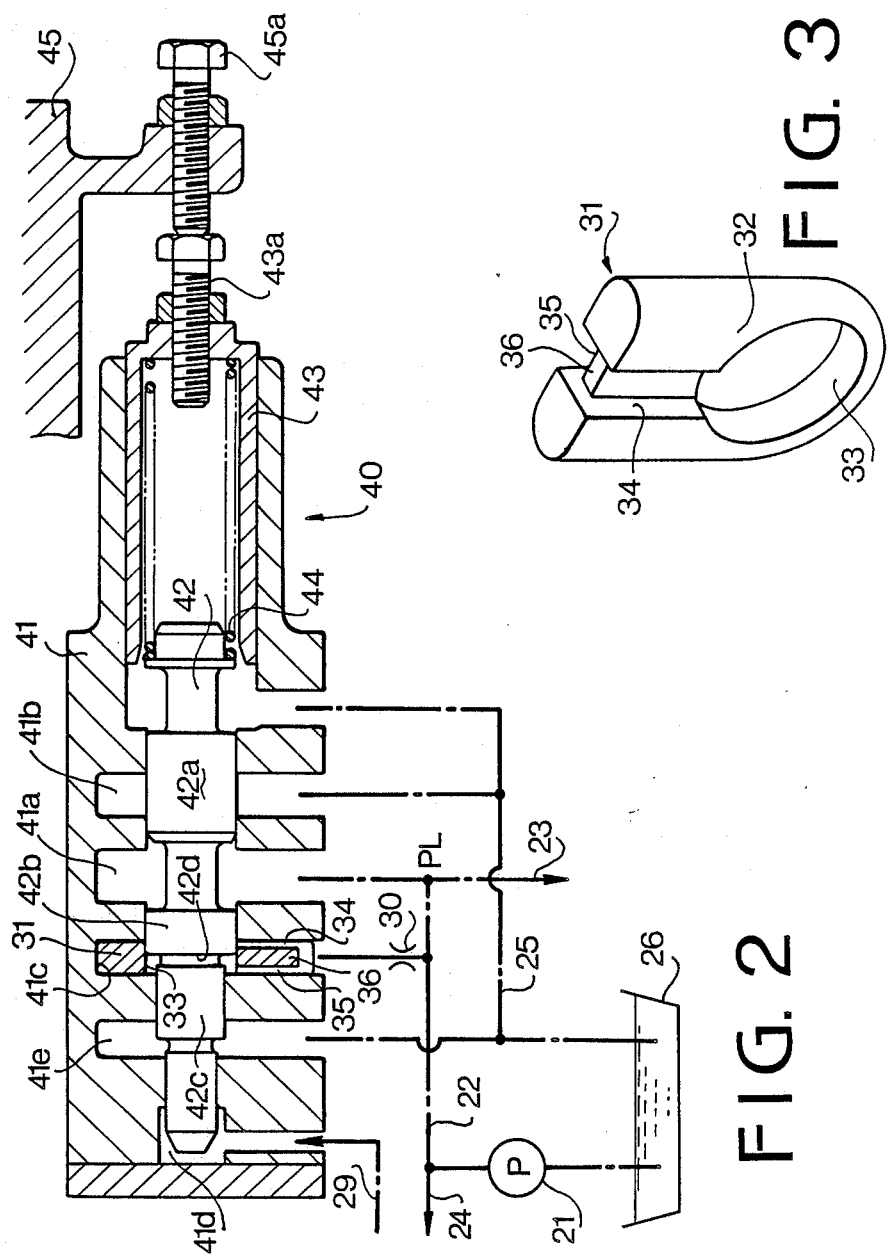

PRESSURE CONTROL VALVE

BACKGROUND OF THE INVENTION

The present invention relates to a control valve for a continuously variable belt-drive automatic transmission for a motor vehicle, and more particularly to a device for decreasing noise produced in a pressure control valve provided in a hydraulic circuit of the control system.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a hydraulic circuit including a pump for supplying oil to the servo devices, a line pressure control valve and a transmission ratio control valve. Each valve comprises a spool to control the oil supplied to the servo devices.

The transmission ratio control valve operates to decide the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on the pulleys in order to transmit the output of the engine.

The line pressure control valve disclosed in U.S. Pat. No. 4,467,674 is adapted to be applied with an elastic force of a spring dependent on the transmission ratio at one end of the spool, and with pitot pressure at the other end to generate line pressure. The line pressure is set to a comparatively high value depending on the transmitted torque and changed in a wide range in dependence dependency on the transmission ratio. Accordingly, the line pressure control valve is arranged to directly control the flow of oil from an oil pump so as to control the line pressure. However, fluctuation of the pump oil pressure causes the valve to vibrate, thereby generating noise. The noise become larger when the temperature of the oil is low.

One way of reducing the noise is to increase the volume of a passage from the pump to the valve, for example, by providing an accumulator communicated with the passage. However, the volume of the accumulator is limited in order to meet the requirement for a compact valve. Another is to reduce the cross-sectional area of the passage so as to increase the resistance. However, when the valve is manufactured by a metal mold, it is difficult to form a sufficiently small passage, due to the fragility of a casting pin.

SUMMARY OF THE INVENTION

The object of the present invention is to provide a pressure control valve wherein noise may be reduced by a simple device.

According to the present invention, there is provided a pressure control valve having a valve body and a spool slidably mounted in the valve body, comprising the valve body having a chamber between opposed first and second lands of said spool, a first passage for applying oil pressure to the chamber, an oil guide provided in the chamber, the oil guide forming a reduced cross-sectional passageway to the first and second lands.

In an aspect of the invention, the pressure control valve has a spring urging said spool in a direction, and the first land is formed to be applied with the oil pressure at one side thereof against the spring.

The other objects and features of this invention will become understood from the following description with reference to the accompanying drawings.

BRIEF DESCRIPTION OF DRAWINGS

FIG. 2 is a schematic diagram of a line pressure control valve; and

FIG. 3 is a perspective view of an oil guide according to the present invention.

DETAILED DESCRIPTION OF THE PREFERRED EMBODIMENT

Figure 1:
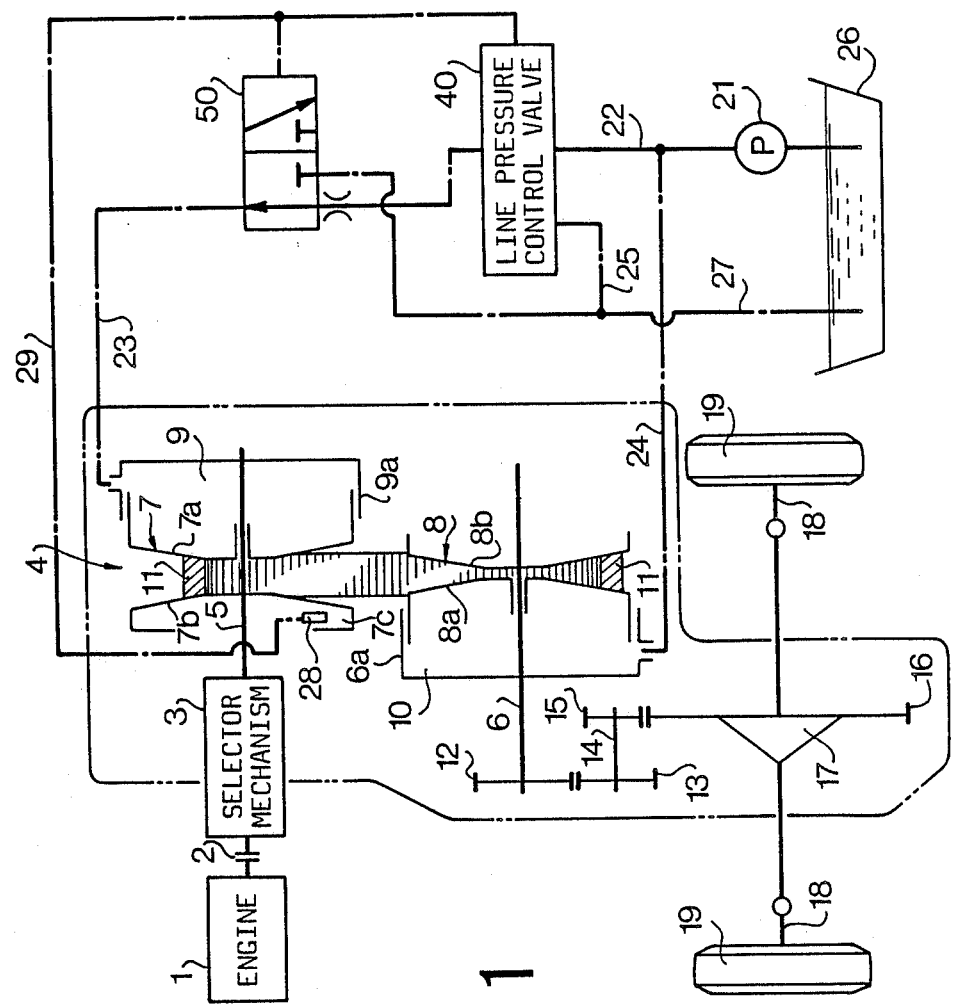
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with main shaft 5 and an axially movable conical disc 7a is axially slidably mounted on the main shaft 5. The movable conical disc 7a also slides in a cylinder 9a formed on the main shaft 5 to provide a servo device.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

A chamber 9 is formed between the axially movable disc 7a and the cylinder 9a of the drive pulley 7. The chamber 9 is supplied with pressurized oil by an oil pump 21 from an oil reservoir 26 passing through a line pressure passage 22, a line pressure control valve 40, transmission ratio control valve 50, and passage 230. A chamber 100 formed between the movable disc 8a and cylinder 6a of driven pulley 8 is applied with pressurized oil through a passage 24 without passing through transmission ratio control valve 50. The movable conical disc 7a of the drive pulley 7 is so designed that the pressure receiving area thereof is larger than that of the movable conical disc 8a of the driven pulley 8.

Oil flows back to the oil reservoir 26 through drain passages 25 and 27 which are in communication with the valves 40 and 50, respectively. The drive pulley 7 has an annular groove 7c and a rotation speed sensor 28 in the form of a pitot tube is provided for detecting the pressure of the oil in the groove, that is the speed of the main shaft 5 which varies in dependency on the engine speed. The pitot pressure produced by the rotation speed sensor 28 is applied to an end of each of the valves 40 and 50 through a passage 29.

Referring to FIG. 2, the line pressure control valve 40 comprises a valve body 41, a spool 42, and a spring 44 provided between a spring retainer 43 and one end of the spool 42 for urging the spool 42 to the left. The spring retainer 43 is axially slidably mounted in the valve body 41. A sensor shoe 45, on end of which is slidably engaged with the movable disc 7a, is provided for detecting the actual transmission ratio.

The sensor shoe 45 has a bolt 45a which engages with an end of a bolt 43a secured to the spring retainer 43. Thus, the position of the movable disc 7a which means the transmission ratio during the operation is transmitted to the spool 42 through the spring 44.

The spool 42 has a pressure regulating land 42a and a balancing land 42b. The land 42a is arranged to control the communication between chambers 41a and 41b.

Adjacent the land 42b and opposite to the chamber 41a, a balance chamber 41c is formed in the valve body 41. The chambers 41a and 41c are supplied with the pressurized oil from the pump 21 through passage 22. An orifice 30 is provided in the passage 22 at an inlet of the chamber 41c. At the end of the valve body 41, opposite to the spring 44, pitot pressure is applied to an end chamber 41d through the oil passage 29. The chamber 41b and a chamber 41e, which is provided between the chambers 41d and 41c for receiving the leakage of the oil from chambers 41c and 41a are communicated with the oil reservoir 26 through drain passage 25.

Thus, the spool 42 is applied with the pitot pressure and pump oil pressure so as to be moved in the direction to communicate the chamber 41a with the chamber 41b, whereas the elastic force of the spring corresponding to the transmission ratio detected by the sensor shoe 45 urges the spool 42 in the direction to close the chamber 41a. Accordingly, high line pressure is generated in the chamber 41a at a low engine speed with a large transmission ratio. The sensor shoe 45 is moved to the right in FIG. 2 as the transmission ratio decreases, reducing the force of the spring 44 to lower the line pressure. The line pressure exerts on the belt 11 a proper force dependent on the transmission ratio so as not to cause the belt to slip on the pulleys.

The land 42b has a side 42d having a larger pressure receiving area than that of a land 42c opposite the land 42b. Thus, the line pressure applied to the balance chamber 41c causes the spool 42 to move to the right against spring 44, so that an extreme increase of the line pressure is prevented.

According to the present invention, in order to reduce the noise from the line pressure control valve 40, an oil guide 31 is embedded in the balance chamber 41c. As shown in FIG. 3, the oil guide 31, which is made of elastic material such as resin, comprises a guide body 32 so shaped as to snugly fit in the chamber 41c. The guide body 32 has a hole 33 in which the land 42b of the spool 42 is slidably engaged. Narrow radial oil passages 34 and 35 are formed on either side of the body 32. The passages 34 and 35 are communicated with each other at the lower ends by a groove 36.

Thus, the space in the chamber 41c is almost entirely occupied by the oil guide 32. The line pressure is applied to the side 42d of the land 42b through groove 36, passages 34 and 35 and the hole 33. Since the cross-sectional areas of the passages for the oil to the land 42b are reduced to increase the resistance thereof, pulsation of oil pressure decreases. Accordingly, noise as well as vibration of the valve 40 is reduced.

The present invention may be applied to other pressure regulator valves and pressure reducing valves in an automatic transmission control system.

From the foregoing, it will be understood that the present invention provides a valve for regulating the pump oil pressure wherein noise and vibration of the valve can be easily diminished by a simple device, thereby increasing the reliability of the valve.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A pressure control valve comprising
   a valve body having opposite land-engaging portions,
   a spool having a first land and a second land spaced opposite each other, said spool is slidably mounted at the land-engaging portions in said valve body at the lands,
   said valve body defining an annular chamber between the land-engaging portions and between the first and second lands of said spool, the annular chamber having a larger outer diameter than that of the first and second lands,
   a passage formed in the valve body communicating with said annular chamber so as to apply oil pressure to said first and second lands, and
   oil guide means secured in the passage for reducing the cross-sectional area of the passage to increase resistance of the passage so as to reduce noise.

2. The pressure control valve according to claim 1, further comprising
   a spring urging said spool in a direction.

3. The pressure control valve according to claim 2, wherein
   said first land is formed to applied with said oil pressure at one side thereof in another direction opposite the direction of urging of said spring.

4. A pressure control valve according to claim 1, wherein
   said oil guide means is made of an elastic material embedded in the annular chamber.

5. A pressure control valve according to claim 1, wherein
   said oil guide means is made of resin.

6. A pressure control valve according to claim 1, further comprising
   an automatic transmission, and wherein
   said control valve is operatively connected to said automatic transmission so as to control said automatic transmission.

7. A pressure control valve according to claim 6, wherein
   said control valve is a line pressure control valve, and wherein
   an oil pump communicate with said passage.

8. A pressure control valve according to claim 7, further comprising
   a spring urging said spool in a direction,
   means for acting on said spring in dependency on the transmission ratio of the transmission.

9. A pressure control valve according to claim 8, wherein
   said transmission is a continuously variable transmission.

10. A pressure control valve according to claim 1, wherein said oil guide means comprises an annular portion disposed in said annular chamber and forming a hole in which said first land is slidably engaged and a portion radially depending from said annular portion, said radially depending portion extending in said passage and having thick side portions and a thin portion centrally connecting said side portions and extending from said hole to a position spaced from a free end of said thick side portions forming a groove between said free ends of said thick side portions and a free end of said thin portion between said side portions, said thin portion dividing said passage into two narrow radial oil passages on respective sides of said thin portion between said thick side portions, said two narrow radial oil passages communicating through said groove, whereby the oil pressure is applied to sides of said lands through said radial oil passages, said groove and said hole.

11. A pressure control valve according to claim 10, further comprising an oil pump communicating with said passages.

12. A pressure control valve according to claim 10, wherein said first land is larger than said second land and said hole is essentially equal in diameter to said first land.

13. A pressure control valve according to claim 1, wherein said oil guide means is also secured in said annular chamber.

* * * * *